United States Patent Office 3,318,200
Patented May 9, 1967

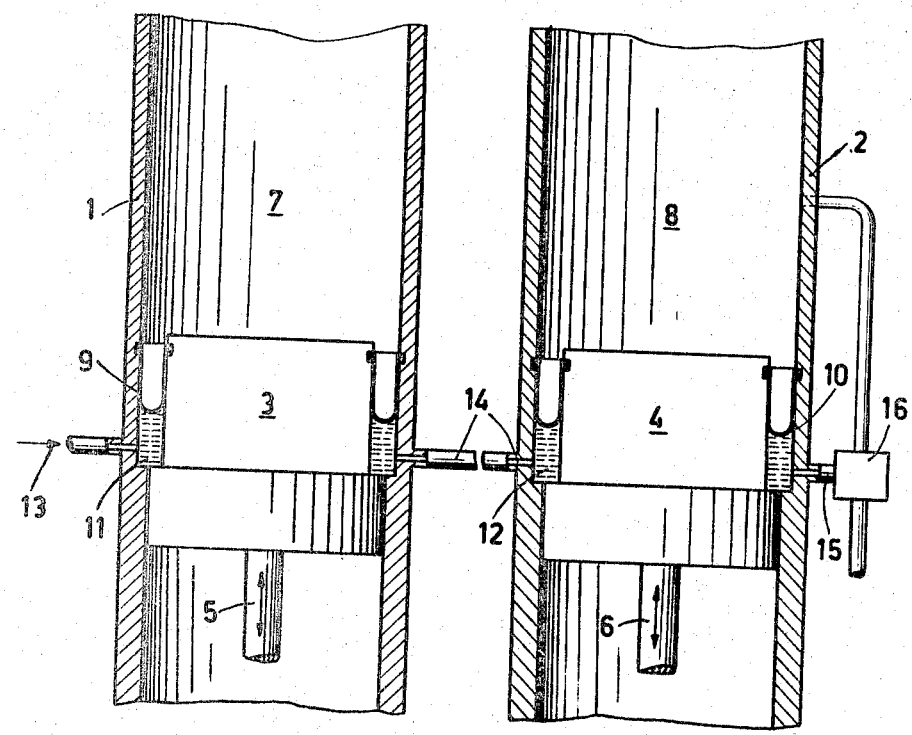
INVENTOR.
JOHAN A. RIETDIJK

3,318,200
DEVICE INCLUDING AT LEAST TWO SEALS IN THE FORM OF ROLLING DIAPHRAGMS
Johan Adriaan Rietdijk, Emmasingel, Eindhoven, Netherlands, assignor to North American Philips Company, Inc., New York, N.Y., a corporation of Delaware
Filed Dec. 3, 1964, Ser. No. 415,673
Claims priority, application Netherlands, Dec. 13, 1963, 301,823
4 Claims. (Cl. 92—61)

In a known seal having the form of a rolling diaphragm, this diaphragm separates two spaces from one another, one space containing a medium and the other space containing a liquid. In the space containing the medium, variations in pressure occur which are also transferred through the rolling diaphragm to the liquid. With this known seal a liquid supply line and a liquid discharge line are connected to the liquid space, a control device being provided for maintaining a pressure difference over the rolling diaphragm which is at least substantially constant.

A difficulty in this known device resides in the diffusion of medium through the rolling diaphragm to the liquid space. The diffused medium may give rise to difficulty with regard to the non-compressibility of the liquid if the concentration in the liquid exceeds a permissible value.

To overcome this difficulty it has previously been suggested to conduct through the liquid supply and discharge lines an amount of liquid through the liquid space under the rolling diaphragm such that the concentration of medium diffused through the rolling diaphragm and dissolved in the liquid remains below a permissible value. The amount of liquid to be passed through will depend upon a number of factors such as the kind of the medium, the pressure prevailing, the material from which the rolling diaphragm is made and the size of the rolling diaphragm.

In a device having a plurality of seals in the form of rolling diaphragms it will be advantageous if all the liquid spaces can be traversed by the liquid and maintained at the correct pressures by means of one liquid pump and one control device.

As a matter of fact, this does not involve any particular problems, if the pressures which occur in the spaces containing the medium are the same and in phase with one another.

If, however, the pressures which occur in the spaces containing the medium are out of phase and/or differ from one another in magnitude then the problem arises that, on the one hand, a certain amount of liquid must be passed through the liquid spaces and, on the other hand, the pressure variations which occur in one liquid space must have no more than a permissible influence on the pressures which occur in a liquid space connected thereto.

The present invention is based on recognition of the fact that the two conditions described hereinbefore may surprisingly be fulfilled by suitable choice of the dimensions of the lines connecting the liquid spaces.

The device according to the invention includes at least two seals in the form of rolling diaphragms, each separating two spaces and each containing a medium, one of the said two spaces being filled with liquid. Furthermore, liquid supply and discharge lines are connected to each of the spaces filled with liquid and, at least one control device being provided to maintain a pressure difference over each rolling diaphragm which is substantially constant at least during each stroke. Moreover, pressure variations occur in the spaces located at both sides of each rolling diaphragm which are out of phase and/or differ in magnitude from the pressure variations which occur in a pair of spaces associated with another rolling diaphragm, all the liquid spaces being connected in series by connecting lines and the pressures prevailing in the liquid spaces situated behind one another in the arrangement being lower and lower. The connecting leads are so proportioned that the liquid volume flowing through at the pressure difference prevailing across the said lines is such as to prevent any concentration of medium diffused through the rolling diaphragm and dissolved in the liquid, while the pressure variations occurring in one of the liquid spaces located at both sides of a connecting line exert no more than permissible influence on the pressure difference across the rolling diaphragm located at the other side of this line.

Another embodiment of the device according to the invention is characterized in that an amount of liquid flows through the liquid spaces connected in series which is at least equal to a predetermined minimum amount, the dimensions of each connecting line at the same time fulfilling the following two relationships:

$$\frac{L}{d^4} \leq \frac{\pi}{128 \times Q_g \times \mu} \times \Delta p_g$$

wherein $L$ = the length of a line connecting two liquid spaces
$d$ = the diameter of a line connecting two liquid spaces
$\mu$ = the dynamic viscosity of the liquid
$Q_g$ = the predetermined volume of liquid flowing through per unit time
$\Delta p_g$ = the permissible difference in mean pressure between the spaces connected by the line and $$\frac{L}{d^2} \geq \frac{\Delta p_w \pi}{4\omega Q_w \rho}$$

wherein $L$ = the length of a line connecting two liquid spaces
$\rho$ = the specific density of the liquid
$d$ = the diameter of a line connecting two liquid spaces
$\omega$ = the frequency in which pressure variations between the two connected liquid spaces occur
$\Delta p_w$ = the magnitude of the maximum pressure difference occurring between two liquid spaces situated behind one another in the arrangement
$Q_w$ = the maximum permissible variation in liquid volume in one of the liquid spaces located at the sides of a connecting line.

In the description of the sole figure in the drawing the two relationships given hereinbefore will be described in detail with reference to a few examples.

In another embodiment of a device according to the invention in which the mean pressures prevailing in the spaces filled with medium are the same, the mean pressure difference ($\Delta p_g$) between two liquid spaces connected by a connecting line, is at most 5 atmospheres. If a higher pressure difference is permitted the pressure differences across the rolling diaphragms become so unfavorable that the life of the diaphragms is influenced very detrimentally.

Another advantageous embodiment of the device according to the invention is characterized in that variations in the liquid volume ($Q_w$) in one of the liquid spaces located at both sides of a connecting line, resulting from the pressure variations occurring, cause the pressure difference across the rolling diaphragm to be varied by at most 90%.

If a greater variation in pressure difference occurs, the rolling diaphragm will in one position tend to exhibit folds which will give rise to very premature breakage.

In order that the invention may be readily carried into effect, it will now be described in detail, by way of example, with reference to the accompanying diagrammatic drawing.

The sole figure shows a device comprising two cylinders 1 and 2 with pistons 3 and 4 adapted to move therein.

The pistons 3 and 4 are connected by means of piston rods 5 and 6 to driving mechanisms (not shown) which can move the pistons in phase of position. During their movement the pistons vary the volumes of working spaces 7 and 8 respectively. The seal between the piston 3 and the cylinder 1 is formed by a rolling diaphragm 9 and the seal between the piston 4 and the cylinder 2 is formed by a rolling diaphragm 10. Spaces 11 and 12 each filled with liquid are present under the rolling diaphragms 9 and 10 respectively. A supply line 13 for the liquid is connected to the space 11. The spaces 11 and 12 communicate with one another by means of a connecting line 14. The space 12 communicates through a line 15 with a control device 16 which allows an amount of liquid to be expelled from the device such that the pressure difference across the rolling diaphragms 9 and 10 respectively remains constant. The control device 16 is substantially identical with the control mechanism 18 illustrated and described in U.S. Patent No. 3,204,858 to Dros.

The device has the following dimensions:

The diameter D of the pistons is 10 cms.

The stroke of the pistons is 6 cms.

The phase of difference between the movements of the pistons is 180°.

The difference between the maximum and minimum pressures occurring in the working spaces 7 and 8 is 30 atm.$=30 \times 10^5$ N/sq. m.

The number of revolutions ($n$) is 600 per minute or 10 per second.

The thickness $d$ of the rolling diaphragms is 0.5 mm.

The width of the gaps in which the rolling diaphragms 9 and 10 are arranged is $s=2$ mms.

To prevent an unwanted concentration of medium diffused through the rolling diaphragm into the liquid in the spaces 11 and 12 and to ensure satisfactory cooling of the rolling diaphragms 9 and 10, one desires, for example, a continuous replacement of liquid of each hour that is to say $Q_g = 3 \times 10^{-7}$ cu. m./sec.

Further one desires to permit, for example, a mean pressure difference between the spaces 11 and 12 which does not exceed 1 atm.$=10^5$ N/sq. m.

The stroke performed by the lower point of the diaphragm will vary slightly as a result of the pressure variations occurring across the line 14. To ensure a long life of the rolling diaphragm it is desired that the lower point of the diaphragm upon movement exhibits a stroke which differs from half the stroke of the piston 3 and 4, respectively, by not more than 1 mm. With the dimensions specified hereinbefore and if the rolling diaphragm is made from polyurethane rubber, this amounts to a variation in the pressure difference across the rolling diaphragm which is 1 atm. ($10^5$ N/sq. m.)

The amplitude of the pressure variations across the line 14 is then $30 - 2 = 28$ atms. ($28 \times 10^5$ N/sq. m.)

The spaces 11 and 12 each contain a liquid having a viscosity $\mu = 10^{-2}$ N sec./sq. m. and a density $\rho = 800$ kgs./cu. m.

To ensure that the device satisfies the requirements specified hereinbefore, the line 14 must have predetermined dimensions L and d which are calculated in the following manner.

For the volume of liquid to be passed through, the following formula results:

$$Q_g \geq \frac{\pi d^4 \Delta p_g}{128 \mu L}$$

or $$\frac{L}{d^4} \leq \frac{\pi \Delta p_g}{128 Q g \mu}$$

After substitution this yields:

$$\frac{L}{d^4} \leq \frac{\pi \times 10^5}{128 \times 3 \times 10^{-7} \times 10^{-2}}$$

$$\frac{L}{d^4} \leq 8.2 \times 10^{11} \quad (1)$$

The permissible variation in the liquid volume present in one of the liquid spaces 11 and 12 (calculated per second) is $Q_w = n \pi D . sx$ permissible variation in length of the rolling diaphragm.

$Q_w = 10 \times \pi \times 0.1 \times 0.002 \times 0.001 = 6.25 \times 10^{-6}$ cu. m./sec.

Now $$Q_w = 2 \times \frac{\pi}{4} d^2 n$$

Herein $x$ is the distance of a liquid particle from its balance condition. This distance will vary by the action of the varying pressure $\Delta \hat{p}_w$ prevailing across the line. Now $\Delta p_w$ may be written as follows:

$$\Delta p_w = \Delta \hat{p}_w \sin \omega t$$

According to $K = ma$. we then have $\Delta \hat{p}_w \sin \omega t = \rho l a$, wherein $a$ represents the acceleration of all liquid particles.

From this it follows that $$a = \frac{d^2 x}{dt^2} = \frac{\Delta \hat{p}_w \sin \omega t}{\rho l}$$

By integrating twice we obtain the position of a liquid particle as a function of time, namely:

$$x = \frac{-\Delta \hat{p}_w}{\rho L \omega^2} \sin \omega t$$

The integration constants are in this case equal to zero. Substituting this in the formula for $Q_w$ gives:

$$Q_w = \frac{2 \Delta \hat{p}_w \frac{\pi}{4} d^2}{\rho L \omega} \cdot \frac{\omega}{2 \pi} = \frac{\Delta \hat{p}_w d^2}{4 L \omega}$$

Since $Q_w$ must be not more than this amount we have:

$$Q_w \leq \frac{\Delta \hat{p}_w d^2}{4 L \omega}$$

thus $$\frac{L}{d^2} \geq \frac{\Delta \hat{p}_w}{4 Q_w \omega \rho} = \frac{\Delta \hat{p}_w}{8 \pi Q_w \rho n}$$

By substituting the values associated with the determined device according to the figure, we have:

$$\frac{L}{d^2} \geq \frac{28 \times 10^5}{8 \times \pi \times 6.25 \times 10^{-6} \times 800 \times 10} = 2.23 \times 10^6 \quad (2)$$

or $$\frac{L^2}{d^4} \geq 5 \times 10^{12} \quad (3)$$

Dividing (1) on (3) yields:

$$L \geq 0.61 \times 10 = 6.1 \text{ meters}$$

Assuming that $L = 7$ meters.

From Formula 2 then follows for the diameter $$d^2 \leq \frac{7}{2.23} \times 10^{-6}$$

$$d \leq 1.75 \text{ mm.}$$

From Formula 1 it follows that:

$$d^4 \geq \frac{7}{8.2} \times 10^{-11} = 8.5 \times 10^{-12}$$

$$d \geq 1.71 \times 10^{-3} m = 1.71 \text{ mm.}$$

Assuming that $d = 1.75$ mm.

The line 14 now satisfies the conditions imposed, namely a constant flow of liquid of 1 l./hr. and no unwanted influencing of the pressure difference across the rolling diaphragm by pressure variations occurring across the line 14.

If, for example, the number of revolutions is increased to 1500 rev./min., Formula 1 remains unchanged since the number of revolutions does not occur therein, so:

$$\frac{L}{d^4} \leq 8.2 \times 10^{11}$$

The formula for the permissible variation in the liquid volume in the spaces 11 and 12 now becomes:

$Q_w = n\pi Ds x$ permissible extension of the rolling diaphragm $$Q_w = \frac{1500}{60} \times \pi \times 0.1 \times 0.002 \times 0.001 = 15.7 \times 10^{-6} \text{ cu. m./sec.}$$

and $$\frac{L}{d^2} \geq \frac{\Delta \hat{p}_w}{8\pi n Q_w \rho}$$

$$\frac{L}{d^2} \geq \frac{28 \times 10^5}{8\pi \times 25 \times 15.7 \times 10^{-6} \times 800} = 0.356 \times 10^6 \quad (4)$$

$$\frac{L^2}{d^4} \geq 0.127 \times 10^{12} = 1.27 \times 10^{11} \quad (4a)$$

Dividing (1) on (4a) now yields $$L \geq 0.155 \text{ m.} = 15.5 \text{ cm.}$$

The diameter with the aid of Formula 4 now becomes:

$$d^2 \leq \frac{0.155}{0.356 \times 10^6} = 0.435 \times 10^{-6}$$

$$d \leq 0.66 \text{ mm.}$$

According to Formula 1 it is necessary that:

$$d^4 \geq \frac{0.1555}{0.82 \times 10^{12}} = 0.189 \times 10^{-12}$$

$$d \geq 0.66 \text{ mm.}$$

This yields the same result in both cases so that $d = 0.66$ mm.

When proportioning the connecting line in accordance with the invention it is thus rendered possible to connect together the liquid space under two rolling diaphragms without detrimental consequences for the rolling diaphragms being involved.

Although only two rolling diaphragms are shown it will be evident that, according to the invention, a plurality of liquid spaces under rolling diaphragms can be connected in series so that only one liquid pump and only one control device is required for all these liquid spaces.

What is claimed is:

1. A device for maintaining the correct liquid pressure on at least two rolling diaphragms located in separate cylinders each having a reciprocating piston therein, said diaphragms each separating two spaces in which one space has a medium therein and the other space is filled with said liquid wherein pressure variations occur in the spaces of said different diaphragms, said liquid spaces being connected in series, comprising a liquid supply pipe for the first liquid space, a connecting line for connecting said liquid spaces, a discharge line for the last liquid space, and a control device provided to maintain a pressure difference over each diaphragm which is substantially constant during each stroke of said piston, said connecting line being so proportioned that the liquid volume flowing through at the pressure difference prevailing across said line is such as to control the level of concentration of medium from one space diffusing to the liquid of said other adjacent space and dissolving therein.

2. A device as claimed in claim 1 wherein an amount of liquid flows through the liquid spaces connected in series which is at least equal to a predetermined minimum amount, the dimensions of each connecting line at the same time fulfilling the following two relationships:

$$\frac{L}{d^4} \leq \frac{\pi}{128 \times Q_g \mu} \times \Delta p_g$$

wherein:

$L =$ the length of a line connecting two liquid spaces
$d =$ the diameter of a line connecting two liquid spaces
$\mu =$ the dynamic viscosity of the liquid
$Q_g =$ the predetermined volume of liquid flowing through
$\Delta p_g =$ the permissible difference in mean pressure between the spaces connected by the line and $$\frac{L}{d^2} \geq \frac{\Delta p_w \pi}{4\omega Q_w \rho}$$

wherein:

$L =$ the length of a line connecting two liquid spaces
$d =$ the diameter of a line connecting two liquid spaces
$\omega =$ the frequency in which pressure variations occur between the two interconnected liquid spaces
$\rho =$ the specific density of the liquid
$\Delta p_w =$ the magnitude of the maximum pressure difference occurring between two liquid spaces situated behind one another in the arrangement
$Q_w =$ the maximum permissible variation in the liquid volume in one of the liquid spaces located at the sides of a connected line.

3. A device as claimed in claim 1 in which the mean pressures prevailing in the spaces filled with medium are the same, and wherein the difference in mean pressure $\Delta p_g$ between two liquid spaces connected by a connecting line is at most 5 atmospheres.

4. A device as claimed in claim 1 wherein the variations in the liquid volume $Q_w$ in one of the liquid spaces located at both sides of a connecting line resulting from the pressure variations occurring cause the pressure difference across the rolling diaphragm to be varied by at most 90%.

References Cited by the Examiner

UNITED STATES PATENTS 3,204,858   9/1965   Dros _____ 230—49

MARTIN P. SCHWADRON, *Primary Examiner.*

G. N. BAUM, *Assistant Examiner.*